Dec. 14, 1926.  
W. S. WILLIAMS  
TWO-WHEEL TRACTOR  
Filed Jan. 20, 1919   8 Sheets-Sheet 7  
1,610,403

Wilbert S. Williams  
INVENTOR.

BY  
Edwin P. Corbett  
ATTORNEY.

Patented Dec. 14, 1926.

1,610,403

UNITED STATES PATENT OFFICE.

WILBERT S. WILLIAMS, OF COLUMBUS, OHIO.

TWO-WHEEL TRACTOR.

Application filed January 20, 1919. Serial No. 271,991.

My invention relates to two wheel tractors and aims to provide a simple and strong structure of tractor which embodies certain novel arrangements and mechanisms that more perfectly adapt the tractor to implements and objects of draft without the necessity of complicated supplemental parts and, in fact, without any parts in the majority of cases.

In making this invention, I have gone directly to an ideal construction where, in practice, the draft structure becomes a single rigid unit which is pivoted between the wheel centers, thus ensuring a straight line pull in any relation of the tractor to the object of draft. In connection with this, I provided a novel distribution of forces and resistances and have provided an extremely simple compensating connection that will ensure a uniform relation of the object of draft to the ground regardless of the position of the tractor.

I have also devised a novel form of clutch operating mechanism that ensures efficient control of the clutch in any position of the draft structure.

There are numerous other features of advantage that will appear as this description progresses in conjunction with drawings referred to, wherein similar characters of reference designate corresponding parts and wherein.

Figure 11:
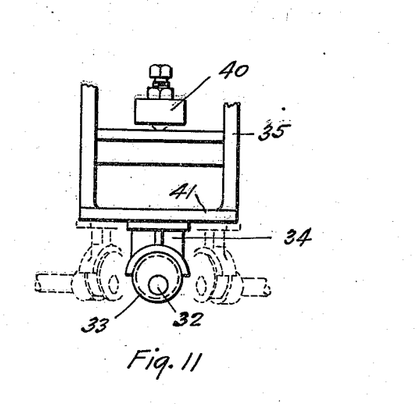
Figure 11 is an end view of the structure shown in Figure 9.
Figure 12:
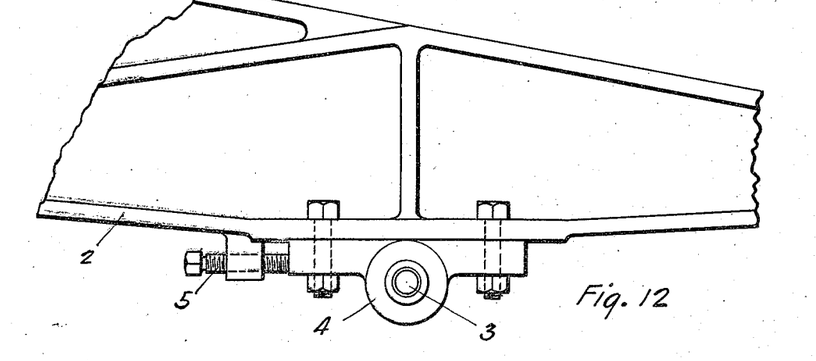
Figure 12 is a detail view illustrating the independent and adjustable mounting of the tractor wheels whereby the driving chains may be tightened or loosened independently.
Figure 13:
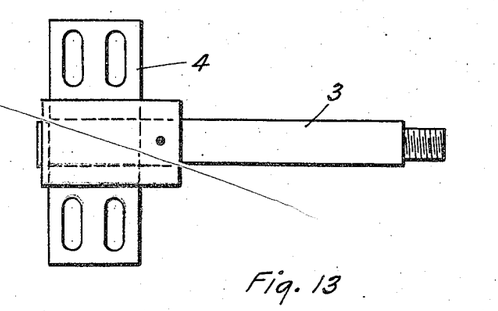
Figure 13 is a detail view of the adjustable block which carries the stub axle for each wheel.
Figure 14:
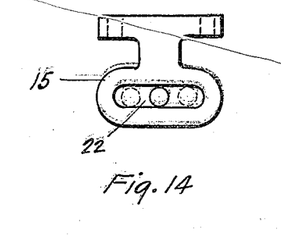
Figure 14 is a detail view of the yieldable connection between the coupling element and the object of draft.

In the drawings, my tractor is shown as comprising two spaced wheels 1 mounted upon a framework 2. In Figures 11, 12 and 13, it will be seen that these wheels are mounted upon stub axles 3 which are carried on blocks 4, these blocks 4 being slidably adjustable by means of screw bolts 5. The wheels 1 are driven by chains 6, one for each wheel, these chains in turn being driven by any suitable form of motor 7. It will be understood that the usual sprockets are provided on the wheels and on the motor driven parts. The motor structure 7 is located upon a frame 2 and is preferably disposed between the centers of the tractor wheels. The clutch for the motor is shown at 8.

The draft structure has several novel features of importance and it comprises a bar 9 pivotally mounted as at 10. It is important to note that this bar 9 extends forward of as well as to the rear of its pivot 10. The bottom of the framework 2 is formed in complement to the bar 9 and pivot 10 to provide a fifth wheel structure with the bar 9 as the moving part. This fifth wheel structure embodies an arcuate track 11 in front of the pivot 10 and upon which the front end of the bar 9 is adapted to slide when it swings about the pivot. It also comprises an arcuate track 12 in the rear of the pivot 10 and cooperative with the rear end of the bar 9, which end is designed to slide upon the said track when it swings. When the object of draft is an agricultural implement, the bar 9 is designed to have two connections with such implement. One of these connections is effected by a novel coupling structure formed in three parts, respectively designated 13, 14 and 15 in Figure 8. The other connection is effected through the medium of a link 16 which is connected to the implement and serves as the real draft rod in forward movement. This link 16 is connected to a downwardly extending member 17 upon the front end of the bar 9. This structure is of vital importance because the link 16 very simply and effectively utilizes the implement drag to counteract the downthrust from the rear of the bar 9. The coupling structure is best shown in Figures 1, 2, 8 and 14 wherein it will appear that the part 13 comprises spaced parallel plates having a serrated clamping connection 18 to the rear end of the bar 9 and having a similar clamping connection 19 to part 14 at the rear of such coupling element. The part 14 comprises a sleeve 20 which carries an angular rear extension 21 to which there is bolted (see Figure 14) the part 15 having a slot 22.

In the operation of the coupling structure, the serrated clamping connection 18 may be loosened to permit swinging of the part 13 in a vertical plane to any position of adjustment. Likewise, the part 14 may also be swung in a vertical plane about the end of the main portion of the part 13, being clamped in any adjusted position by the serrated clamp 19. It is worthy of note that the member 14 may also be easily swung to any position underneath the part 13. By adjusting these parts as desired, the rear end of the bar 9 may be connected to an implement or any draft object of practically any height. The slotted member 15 is of utmost importance because a bar on the implement or to be placed thereon is designed to be supported in this slot with such freedom of movement that the draft structure formed by the bar 9 and coupling 13, 14 and 15 together with the link 16 will adjust itself in such a manner that the implement being drawn will maintain a constant and proper level with relation to the ground regardless of the roughness of the ground over which the tractor is passing and irrespective of the tilt of the tractor.

The coupling structure may also be adjusted to vary the position of the draft bar, as by raising or lowering. An illustration of the desirability of this may be found in the fact that it is sometimes desirable to slightly tilt the drawbar upwardly when the tractor is attached to a plow, so that when plowing is done the drawbar will be level.

The main draft in the forward movement of the tractor when attached to an implement is through the link 16 and the fact that this link 16 is connected to the bar 9 in front of the pivot 10 produces the very important result of counter-acting the downthrust of the rear of the tractor upon the implement by the inevitable drag produced by the implement. The connection is simple and direct from the implement to a point in front of the pivot of the bar 9. In turn, this bar 9 is firmly braced against the framework 2 of the tractor whether the tractor is moving forward or backward, by means of the tracks 11 and 12 of the fifth wheel structure.

Figure 1:
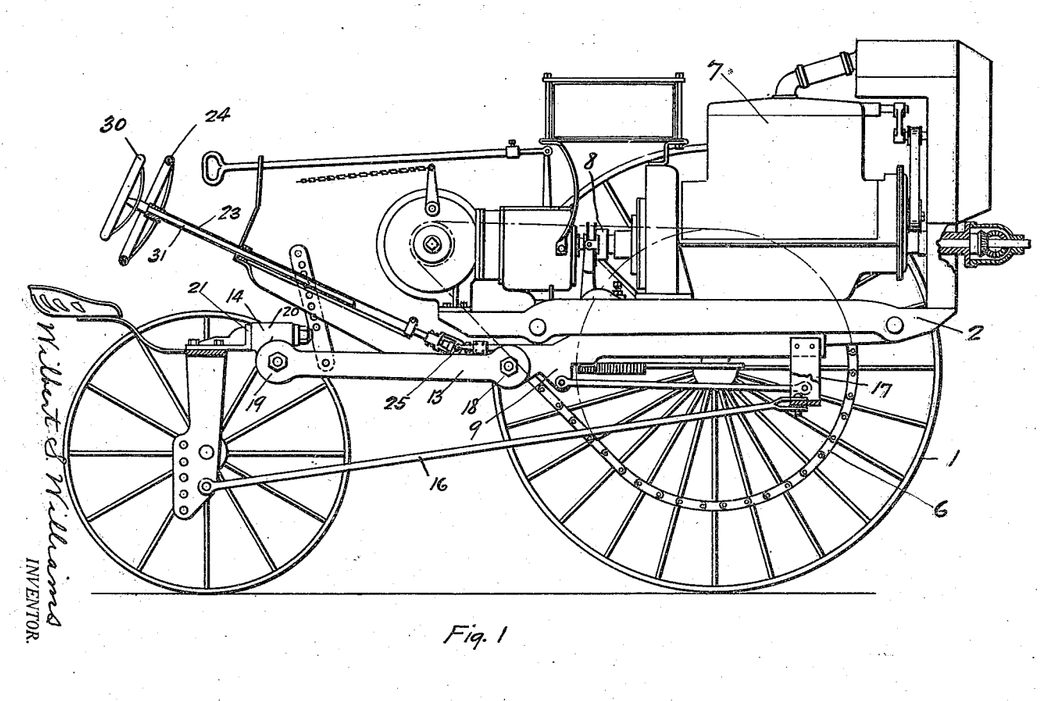
Figure 1 is a side elevation of my tractor, showing supplemental supporting wheels to facilitate transporting the tractor from place to place when it is not attached to an implement.
Figure 2:
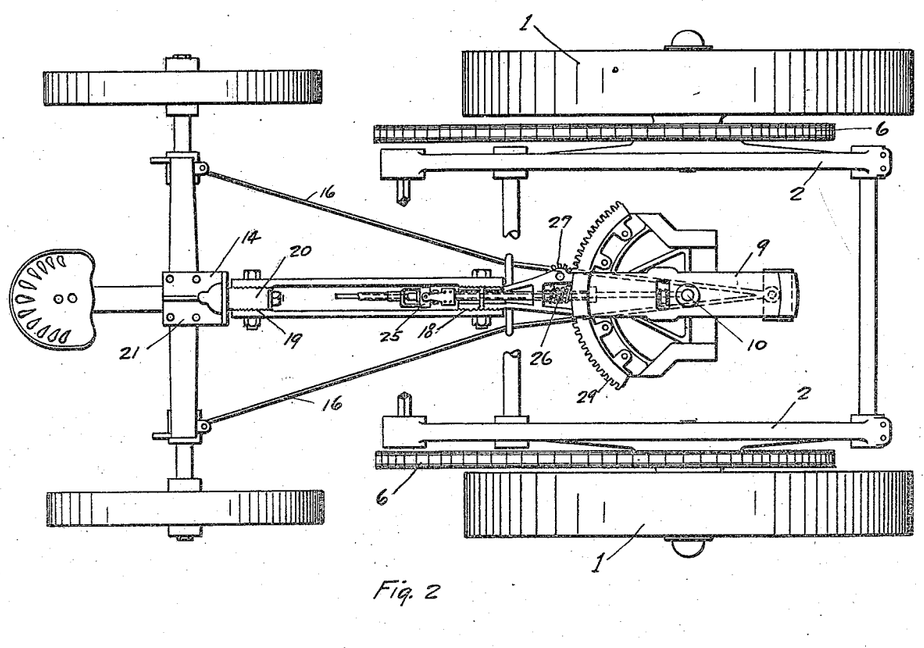
Figure 2 is a plan view of the structure shown in Figure 1 with the motor parts removed.
Figure 3:
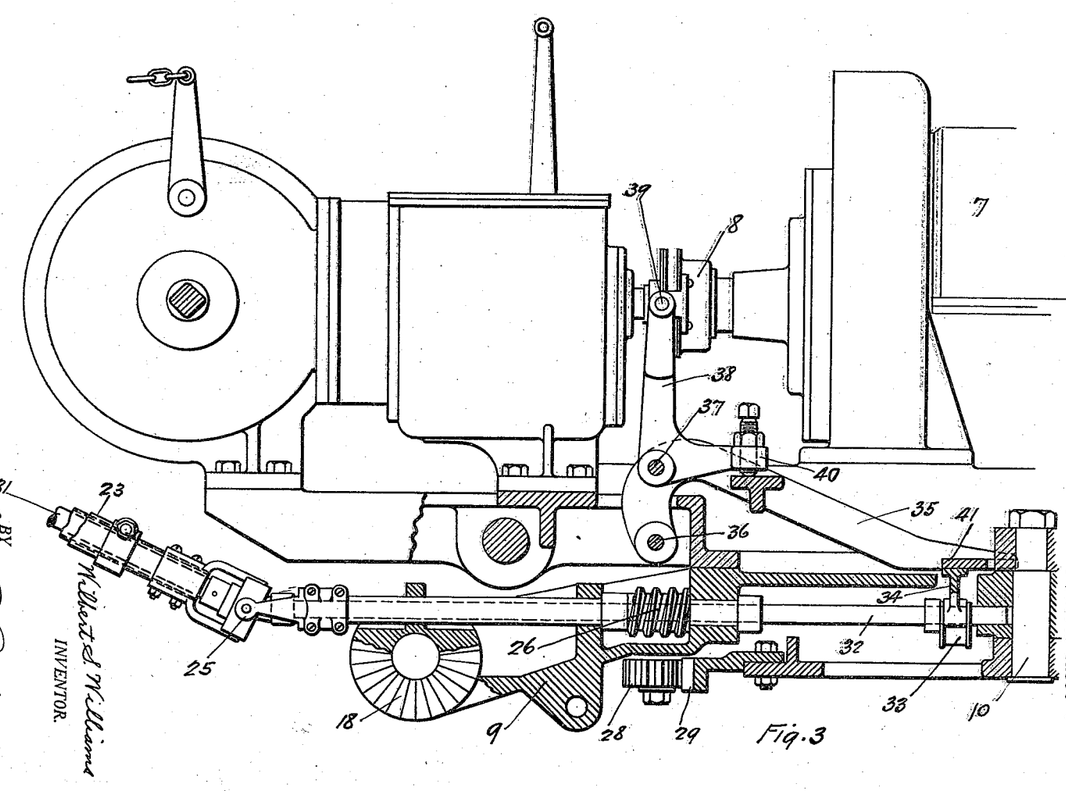
Figure 3 is an enlarged detail principally illustrating the novel form of clutch controlling device.
Figure 4:
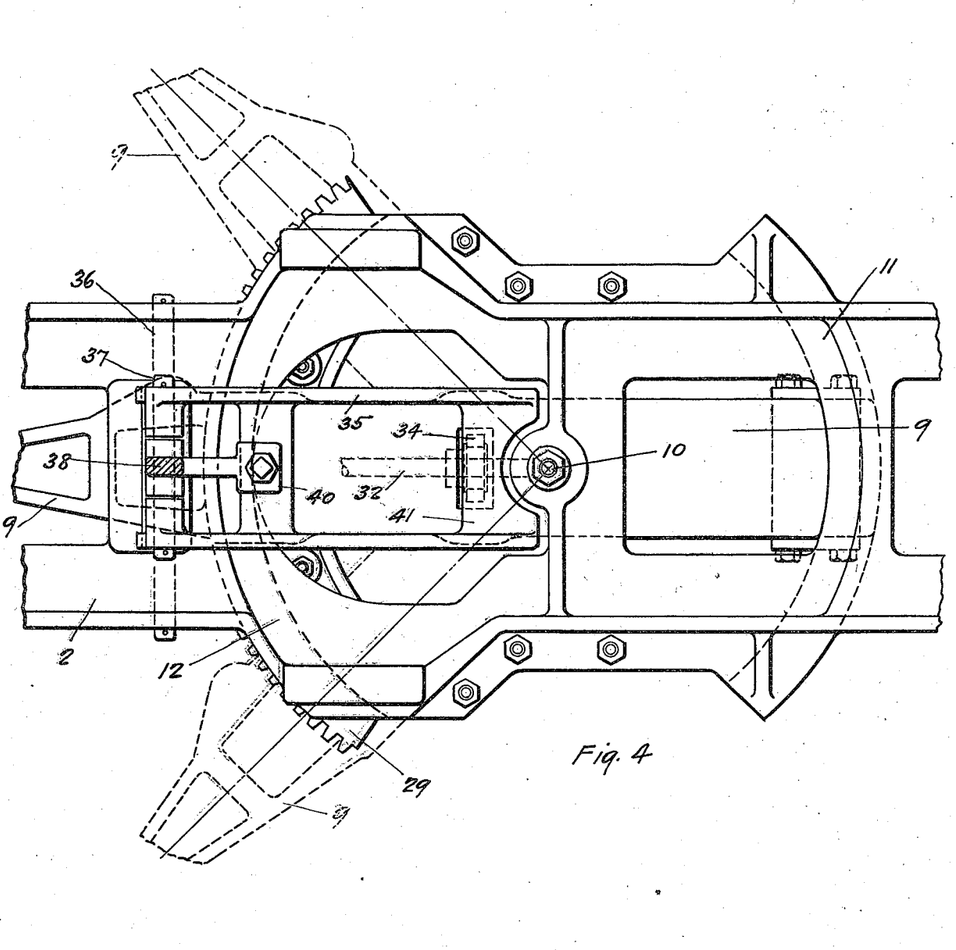
Figure 4 is a plan view of the structure shown in Figure 3 with the clutch and engine parts removed.
Figure 5:
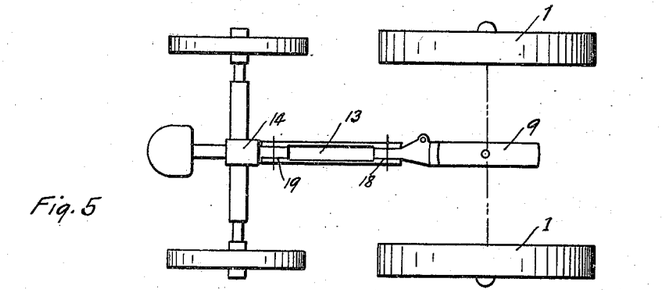
Figures 5, 6 and 7 are diagrammatic representations illustrating the manner in which the novel form of draft structure and mounting ensures a straight line of draft from the wheel centers to the object being drawn.
Figure 6:
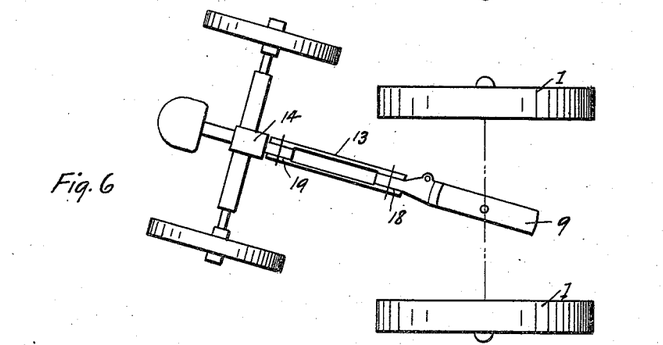
Figure 7:
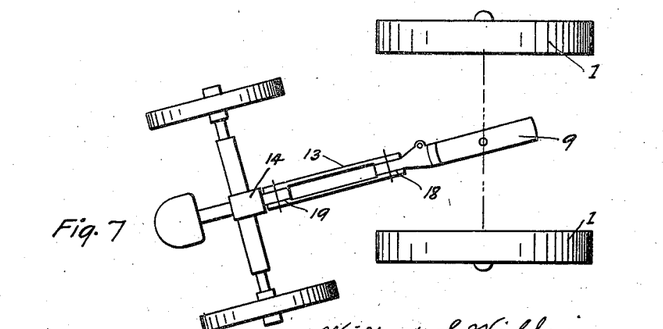
Figure 8:
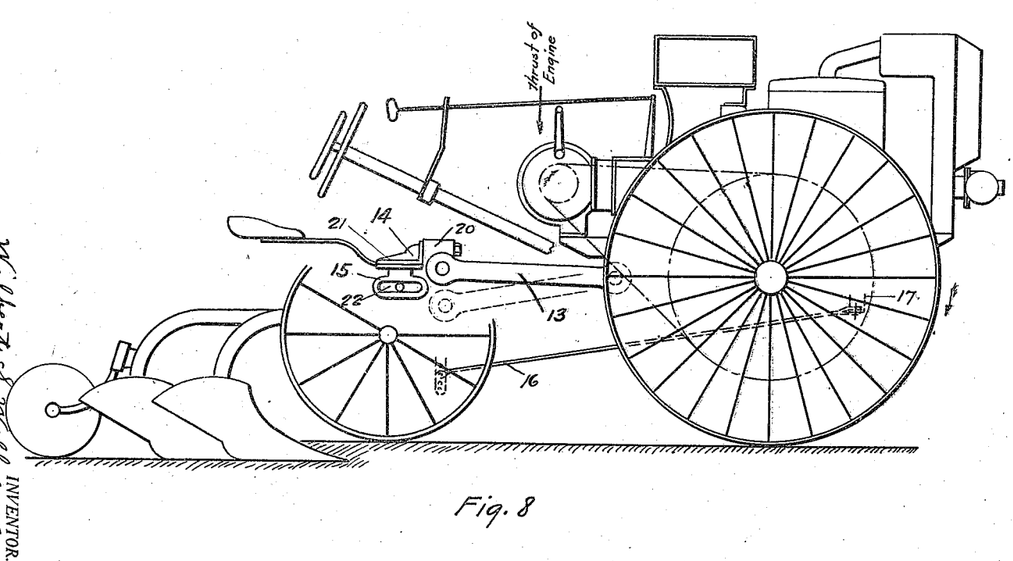
Figure 8 is a side elevation of my tractor shown connected to an implement.
Figure 9:
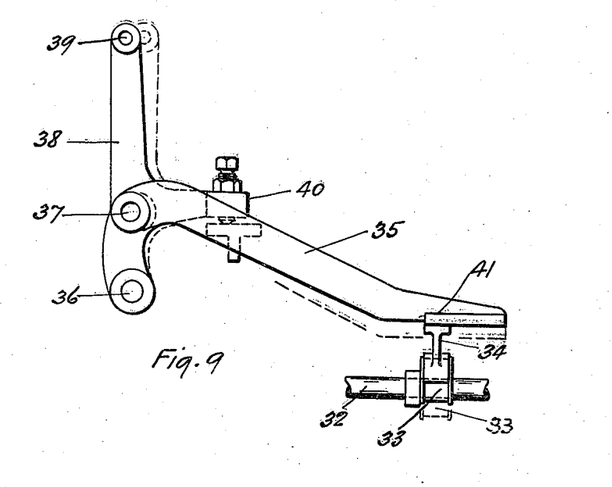
Figure 9 is a side elevation of a novel form of sliding leverage element used by me in the operation of my clutch.

The tractor is steered by means of a steering rod of sleeve-like form shown at 23 and provided with a hand wheel 24, this steering rod being connected by a universal joint as at 25 with a worm shaft 26 (Figure 2) which is in turn connected with a worm 27 upon the shaft of a pinion 28 (Figure 3), which pinion meshes with a segmental rack 29 (shown best in Figure 2).

Figure 10:
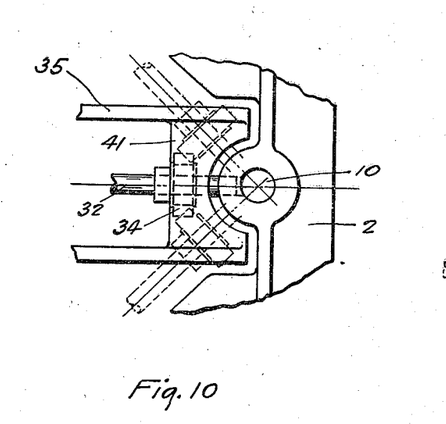
Figure 10 is a plan view of the sliding bearing structure through which the clutch operating lever is controlled from a controlling rod mounted on the draft structure.

An extremely simple and important portion of my invention consists in the mechanism for operating the clutch of the motor regardless of the angular relation of the draft structure to the motor structure. The controlling handle for operating this clutch is shown at 30 in Figure 1 and is mounted upon a rod 31 which passes through the hollow steering rod and which is connected by a universal joint to a rod 32, which rod 32 extends along within the bar 9 to the pivot 10 thereof. The rod 32 carries an eccentric structure 33 upon which is mounted a block 34 and this block 34 is designed for a sliding contact with the arm of a lever 35. The lever 35 is pivoted at 36 and pivoted thereon at 37 is a second lever 38 with one end operatively connected to the movable clutch part as at 39 and with the other end having an adjustable bearing as at 40 upon the lever 35. The front end of the lever 35 takes the form of an arcuate shoe 41 (best shown in Figure 10) and this shoe 41 remains in sliding contact with the upper surface of the block 34 regardless of the angle that the bar 9 takes with relation to the motor structure framework of the tractor. Thus, in operation, rotation of the rod 32 by means of the rod 31 and hand wheel 30 will lift the under end of the lever 35 to operate the clutch irrespective of whether, at the moment, the implement is traveling in the same direction with the tractor or whether it is traveling in another direction, as in turning.

Figure 15:
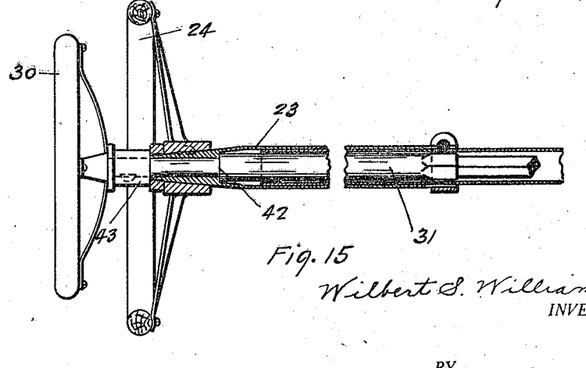
Figure 15 is a detail view showing the manner in which my steering rod and clutch operating rod are locked together and may, therefore, be extended and shortened at one operation.

It will be understood that the clutch operating rods are free to turn in the tubular steering rods. It is also important to note that these rods, though independently rotatable, are so locked together that they are extensible at one operation. More explicitly, with reference to Figure 15, the steering rod 23 comprising telescoping tubular parts contains the clutch operating rod 31 which is also telescoping. These rods are locked together by means of shoulder 42, hub 43 of the clutch rod hand wheel, and steering rod hand wheel 44. By the structure both rods may be extended or shortened to accommodate any implement.

It will be obvious that my tractor is marked by a number of vital elements that are simple and novel and it will be understood that the form of these parts may be varied considerably without departing from the principle thereof.

Having thus described my invention, what I claim is:

1. A two-wheel tractor comprising supporting wheels, a driving motor, a driving connection between said motor and said wheels, a draw-bar pivoted at the vertical center of said wheels and extending forwardly thereof, and a link for connecting a point of said draw bar in front of the vertical center line of said wheels to the implement to be drawn at a point below the horizontal center of said wheels.

2. A two-wheel tractor comprising wheels, a motor structure, a support for said motor structure, a pivotal bar centered substantially in between and on a level with the wheel centers, said bar extending forwardly and rearwardly of its pivoted center, and arcuate supports having a sliding engagement with said bar on said support forwardly and rearwardly of said center.

3. A two-wheel tractor comprising wheels, a motor structure, a fifth wheel structure centered substantially in between and on a level with the wheel centers, and a drawbar swinging with said fifth wheel and extending in front thereof, and a link connecting the forward part of said bar to the object of draft.

4. A two-wheel tractor comprising a body portion and a coupling element adjustable for attachment to objects of varying height, said element comprising clamping means to hold it in fixed relation to the tractor after adjustment, and a means for forming a freely slidable connection between said element and said object.

5. A two-wheel tractor comprising a body portion and a coupling element formed in two parts which are pivotally adjustable in a vertical plane with relation to each other and bodily with relation to the tractor.

6. A two-wheel tractor comprising a body portion, a coupling element movable about a horizontal pivot on said tractor and constructed to be rigidly clamped in any position to which it is moved, and another coupling element connected to said element and similarly pivoted and constructed with relation thereto.

7. A two-wheel tractor comprising a body portion, and a coupling comprising a member connected to said body portion and pivotally adjustable in a vertical plane, means for clamping said member in any adjusted position, a second member connected to said first member and pivotally adjustable in a vertical plane, means for clamping said second member in any adjusted position, and a third member rotatably mounted on said second member.

8. A two-wheel tractor comprising supporting wheels, a driving motor, a driving connection between said motor and said wheel, and means to connect said tractor to the object of draft of such structure as to form a yieldable connection between said tractor and said object, said connection being freely slidable and adapted to compensate for the up and down movement of said object of draft as it is being drawn over rough ground.

9. A two-wheel tractor comprising supporting wheels, a driving motor, a driving connection between said motor and said wheels, and a draft structure member with a yieldable connection within itself for rendering the connecting means of an implement bodily movable relative to said draft structure to automatically compensate for the up and down movement of an implement being drawn over rough ground and thereby maintain it in the same relation to the ground regardless of the relative position of the tractor.

10. A two-wheel tractor comprising supporting wheels, a driving motor, a driving connection between said motor and said wheels, and a means yieldably connecting said tractor to an object of draft for rendering the connecting means of said object freely movable and to positively maintain the object of draft in its adjusted angular relation to the ground when the tractor assumes varying elevations.

11. A tractor comprising wheels, a motor structure, a drawbar pivoted to said motor structure, a lever carried on said motor structure, a rotatable rod on the drawbar, and an eccentric sliding connection with the end of said lever operable to actuate said lever by rotation of said rod.

12. A tractor comprising wheels, a motor structure, a drawbar pivoted to said motor structure, multiple coacting levers carried on said motor structure for operating a motor part, a device on said drawbar having a slidable bearing on one end of said lever and operable through such bearing to move said lever to operate said part and adjusting means between said multiple levers.

13. In a two-wheel tractor, a motor structure and a coupling structure adjustable about an adjustable horizontal pivot to vary the angle of the draft device with relation to the ground.

14. In combination, a tractor, an engine and a control therefor on said tractor, an object of draft connected to said tractor, means to operate said control operable from the object of draft and adjustable in fixed relation thereto, and means bodily movable relative to said control for maintaining an operative connection between said operating means and said control at all varying relative positions of the object of draft to the tractor.

In testimony whereof I hereby affix my signature.

WILBERT S. WILLIAMS.